(12) United States Patent
Graber

(10) Patent No.: US 11,553,637 B2
(45) Date of Patent: Jan. 17, 2023

(54) SKID STEER MANURE SPREADER ATTACHMENT

(71) Applicant: Noah Graber, Grabill, IN (US)

(72) Inventor: Noah Graber, Grabill, IN (US)

(73) Assignee: Noah Graber, Grabill, IN (US)

( * ) Notice: Subject to any disclaimer, the term of this patent is extended or adjusted under 35 U.S.C. 154(b) by 425 days.

(21) Appl. No.: 16/863,908

(22) Filed: Apr. 30, 2020

(65) Prior Publication Data

US 2021/0022285 A1  Jan. 28, 2021

Related U.S. Application Data

(60) Provisional application No. 62/877,568, filed on Jul. 23, 2019.

(51) Int. Cl.
| | | |
|---|---|---|
| *A01C 3/06* | (2006.01) | |
| *E02F 3/96* | (2006.01) | |
| *E02F 9/22* | (2006.01) | |
| *F16H 7/08* | (2006.01) | |
| *F16H 7/06* | (2006.01) | |

(52) U.S. Cl.
CPC .............. *A01C 3/066* (2013.01); *E02F 3/96* (2013.01); *E02F 9/2271* (2013.01); *E02F 9/2275* (2013.01); *F16H 7/06* (2013.01); *F16H 7/08* (2013.01); *F16H 2007/088* (2013.01); *F16H 2007/0872* (2013.01); *F16H 2007/0893* (2013.01); *F16H 2007/0897* (2013.01)

(58) Field of Classification Search
CPC .......... A01C 3/066; E02F 3/96; E02F 9/2271; E02F 9/2275; F16H 7/06; F16H 7/08; F16H 2007/0872; F16H 2007/088; F16H 2007/0893; F16H 2007/0897
USPC ............................................................ 222/1
See application file for complete search history.

(56) References Cited

U.S. PATENT DOCUMENTS

| | | | | |
|---|---|---|---|---|
| 1,187,953 | A * | 6/1916 | Whitely et al. | A01C 3/066 474/121 |
| 2,292,952 | A * | 8/1942 | MacDonald | A01C 3/066 474/121 |
| 2,684,785 | A * | 7/1954 | Waldorf | A01C 15/18 222/274 |
| 5,592,760 | A * | 1/1997 | Kohout | E01C 19/2025 D15/32 |
| 5,827,038 | A * | 10/1998 | Barden | E02F 3/407 37/903 |
| 6,047,908 | A * | 4/2000 | Seymour | A01C 3/063 239/682 |
| 6,193,403 | B1 * | 2/2001 | Nystrom | B01F 35/751 366/186 |

(Continued)

*Primary Examiner* — Justin M Jonaitis

(57) ABSTRACT

The skid steer manure spreader attachment includes a main bucket compartment, a cover, and a beater shaft. The bucket, cover, and beater shaft are preferably formed of welded steel. The bucket has an industry standard quick attach plate on the back so it can be quickly attached to any standard skid steer, and is a standard width. A hydraulic motor operates the beater shaft and the cover. The beater shaft has blades angled in two directions. The beater shaft spins forward so the beater blades through manure out of the top of the bucket, above the shaft. The hydraulic motor drives the top sprocket, and a chain drives the bottom sprocket. A tensioner pivots on one screw to allow the user to tension the chain as needed.

17 Claims, 11 Drawing Sheets

(56) References Cited

U.S. PATENT DOCUMENTS

| | | | |
|---|---|---|---|
| 7,510,365 B2 * | 3/2009 | Babiarz | E02F 3/3414 37/903 |
| 7,712,233 B2 * | 5/2010 | Nesseth | E01C 19/203 37/409 |
| 2005/0145399 A1 * | 7/2005 | Nesseth | A01C 15/16 172/35 |

* cited by examiner

SKID STEER MANURE SPREADER ATTACHMENT

CROSS-REFERENCE TO RELATED APPLICATION

The present application is related to and claims priority from prior provisional application Ser. No. 62/877,568, filed Jul. 7, 2019, the entire application of which is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

The present invention relates generally to the field of skid loader attachment devices and more specifically relates to a skid steer bucket attachment comprising a beater and a spreader function structured and arranged for scooping and spreading manure.

2. Description of the Related Art

A skid steer, or a skid steer loader, is a small, rigid-frame, engine-powered machine with lift arms used to attach a wide variety of labor-saving tools or attachments.

Skid-steer loaders are typically four-wheel vehicles with the wheels mechanically locked in synchronization on each side, and where the left-side drive wheels can be driven independently of the right-side drive wheels. The wheels typically have no separate steering mechanism and hold a fixed straight alignment on the body of the machine. Turning is accomplished by differential steering, in which the left and right wheel pairs are operated at different speeds, and the machine turns by skidding or dragging its fixed-orientation wheels across the ground. The extremely rigid frame and strong wheel bearings prevent the torsional forces caused by this dragging motion from damaging the machine. As with tracked vehicles, the high ground friction produced by skid steers can rip up soft or fragile road surfaces.

The conventional bucket of many skid loaders can be replaced with a variety of specialized buckets or attachments, many powered by the loader's hydraulic system. These attachments include backhoes, hydraulic breakers, pallet forks, angle brooms, sweepers, augers, mowers, snow blowers, stump grinders, tree spades, trenchers, dumping hoppers, pavement millers, rippers, tillers, grapples, tilts, rollers, snow blades, wheel saws, cement mixers, and wood chipper machines, to name a few.

Some models of skid steer now also have an automatic attachment changer mechanism. This allows a driver to change between a variety of terrain handling, shaping, and leveling tools without having to leave the machine, by using a hydraulic control mechanism to latch onto the attachments. Hydraulic supply lines to powered attachments may be routed so that the couplings are located near the cab, and the driver does not need to leave the machine to connect or disconnect those supply lines.

Skid steers are commonly used by farmers/ranchers to assist with the many things that need to be done around the farm/ranch, and are therefore often owned by small farmers/ranchers. One common use for skid steers is to clear out horse stalls. Typically, horse stalls are cleaned on a daily or weekly basis, and the manure is dumped into piles. When the piles become large enough, the manure needs to be spread onto property, both to free space in the yard for more manure, and because manure is an excellent fertilizer, and so is used to fertilize the land, which is often horse pasture or other farmland.

Generally, manure is spread using a manure spreader trailer. The manure spreader trailer must be filled by hand, or with a tractor or skid steer. The manure spreader then spreads the manure across the land while being towed by a 4-wheeler, tractor, or horse. Both filling the trailer and then towing it across the fields is a slow and cumbersome process, and having to buy a manure spreader is costly, particularly as it only does one thing.

Various attempts have been made to solve problems found in mixer device art. Among these are found in: U.S. Pat. No. 6,193,403 to Leroy C. Nystrom; U.S. Pat. No. 7,510,365 to Stacey A. Babiarz; U.S. Pat. No. 5,827,038 to William M. Barden; U.S. Pat. No. 7,712,233 to Clinton A. Nesseth; and U.S. Pat. No. 5,592,760 to Darryl A. Kohout. This prior art is representative of skid steer and loader bucket mixer devices.

None of the above inventions and patents, taken either singly or in combination, is seen to describe the invention as claimed. Thus, a need exists for a reliable skid steer manure spreader, a skid steer bucket attachment comprising a beater and a spreader function structured and arranged for scooping and spreading manure, to avoid the above-mentioned problems.

BRIEF SUMMARY OF THE INVENTION

In view of the foregoing disadvantages inherent in the known skid steer attachment device art, the present invention provides a novel skid steer manure spreader attachment. The general purpose of the present invention, as described subsequently in greater detail, is to provide a skid steer bucket attachment comprising a beater and a spreader structured and arranged for scooping and spreading manure.

The skid steer manure spreader attachment includes a main bucket compartment, a cover, and a beater shaft. The bucket, cover, and beater shaft are preferably formed of welded steel. The bucket has an industry standard quick attach plate on the back so it can be quickly attached to any standard skid steer, and is a standard width.

A hydraulic motor operates the beater shaft and the cover. The beater shaft has blades angled in two directions. The beater shaft spins forward so the beater blades through manure out of the top of the bucket, above the shaft. The hydraulic motor drives the top sprocket, and a chain drives the bottom sprocket. A tensioner pivots on one screw to allow the user to tension the chain as needed.

The present invention holds significant improvements over the currently available manure spreader trailers, and serves as a skid steer manure spreader attachment. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention that are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures that accompany the written portion of this specification illustrate embodiments and method(s) of use for the present invention, a skid steer manure spreader attachment, constructed and operative according to the teachings of the present invention.

The various embodiments of the present invention will hereinafter be described in conjunction with the appended drawings.

DETAILED DESCRIPTION

As discussed above, embodiments of the present invention relate to a spreader device and more particularly to a skid steer manure spreader attachment.

Figure 1:
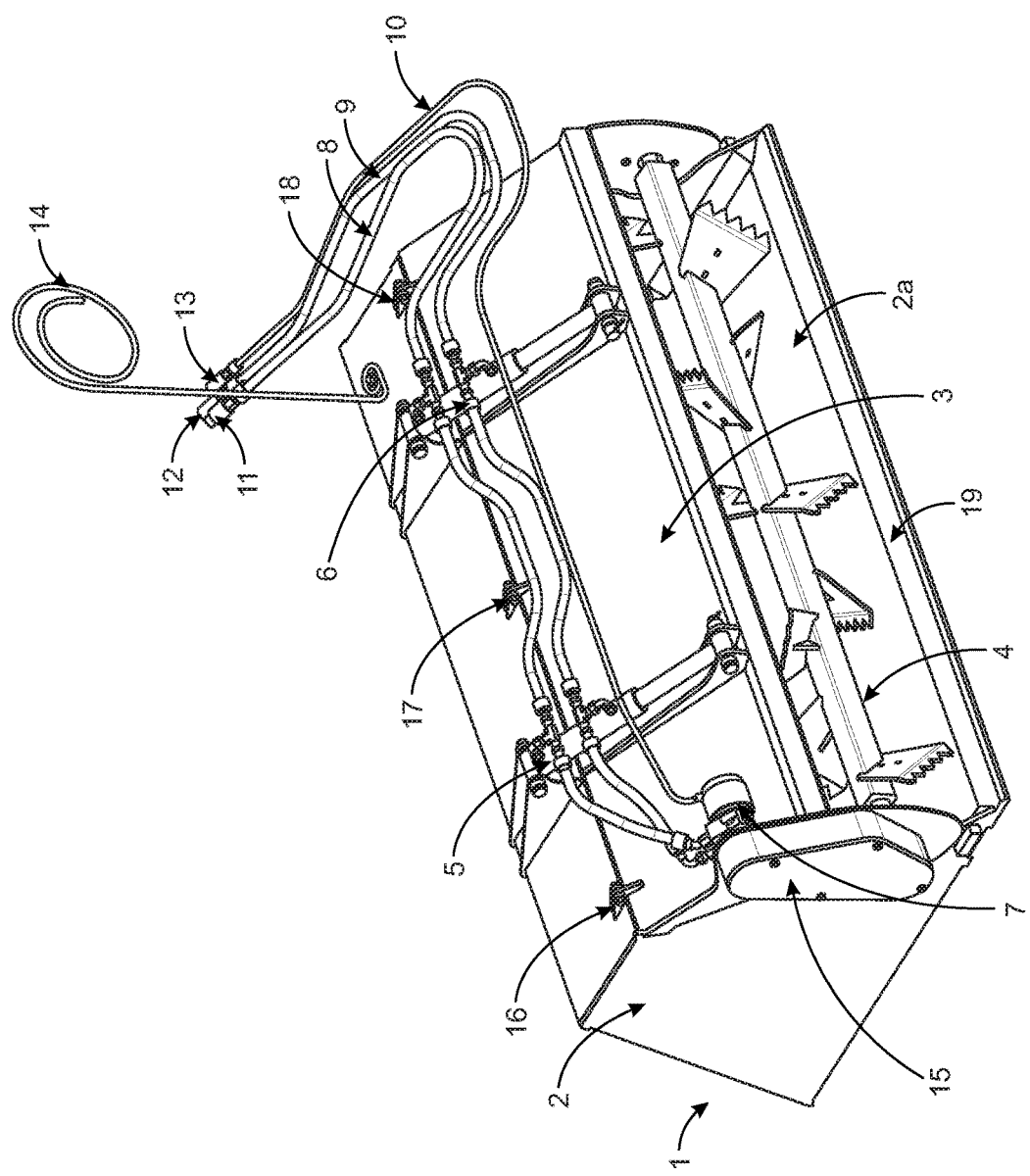
FIG. 1 shows a perspective view illustrating a skid steer manure spreader attachment with the cover closed, according to an embodiment of the presently claimed invention.

Referring now to FIG. 1, the skid steer manure spreader attachment 1 includes a main bucket compartment 2, a cover 3, and a beater shaft 4. The bucket 2, cover 3, and beater shaft 4 are preferably formed mainly from ¼ inch steel, welded to shape. All steel parts of the skid steer manure spreader attachment may be powder coated or painted to protect the metal from rusting.

The cover 3 and beater shaft 4 are operated by a hydraulic system including two standard hydraulic cylinders 5, 6, for opening and closing the cover 3, and a standard hydraulic motor 7 for rotating the beater shaft 4, such as a vane motor or a gear motor. The hydraulic system also includes three hoses 8, 9, 10. The three hoses 8, 9, 10 have standard attachments 11, 12, 13 that allow the hoses 8, 9, 10 to attach to any standard skid steer 100 and provide the oil flow to power the hydraulic system.

The bucket 2 also has a hose holder 14 attached to it, to hold the three hoses 8, 9, 10 out of the way of any moving parts on the manure spreader attachment 1 or the skid steer 100, and a housing 15 to cover the chain 702 and sprocket 701, 703 system. The cover 3 is attached to the bucket 2 via three hinges 16, 17, 18. The bucket 2 also has a lip 19 on the front lower edge of the base 2a, to help scoop manure.

Figure 2:
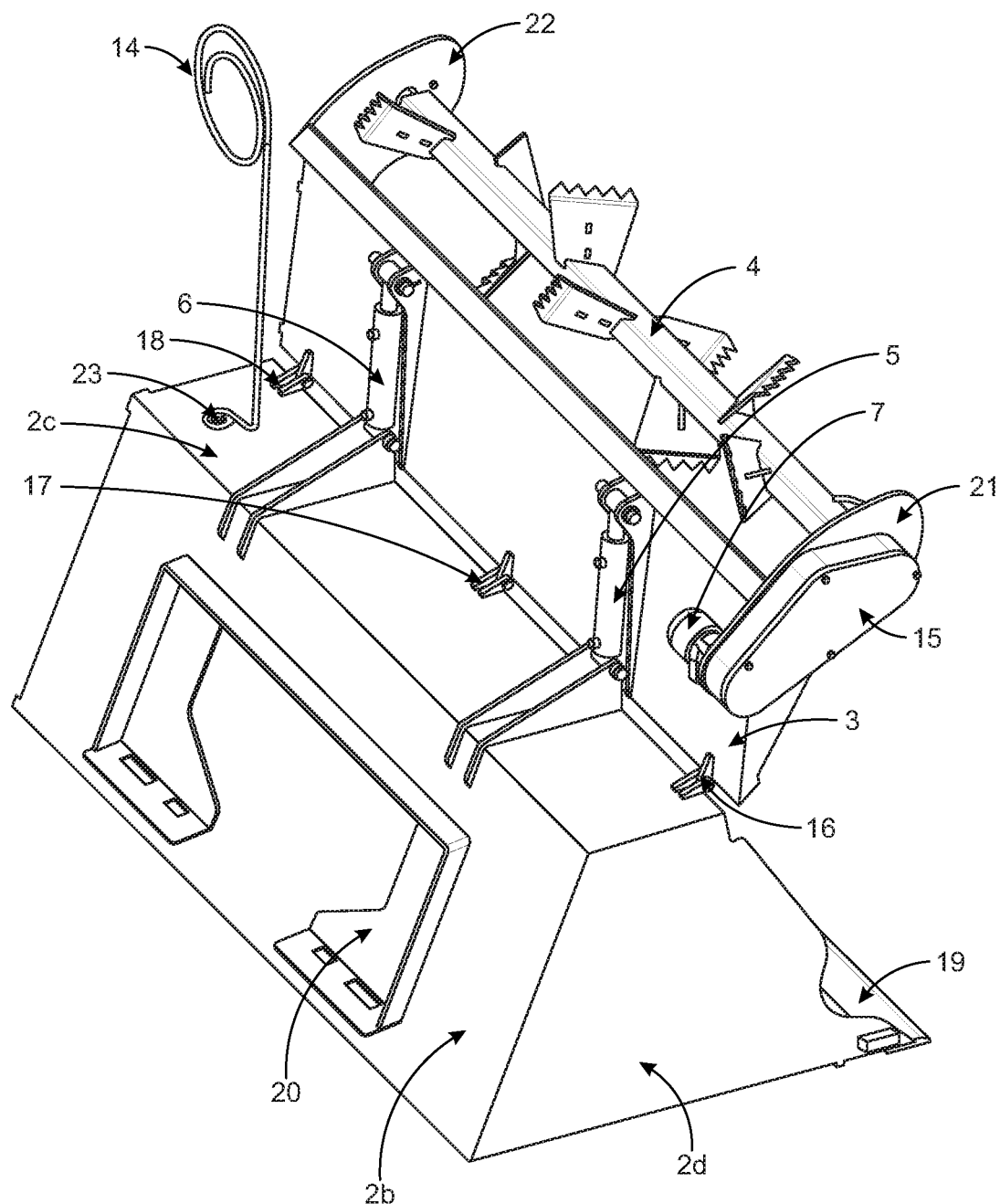
FIG. 2 shows a perspective view illustrating a skid steer manure spreader attachment with the cover open, according to an embodiment of the presently claimed invention.
Figure 3:
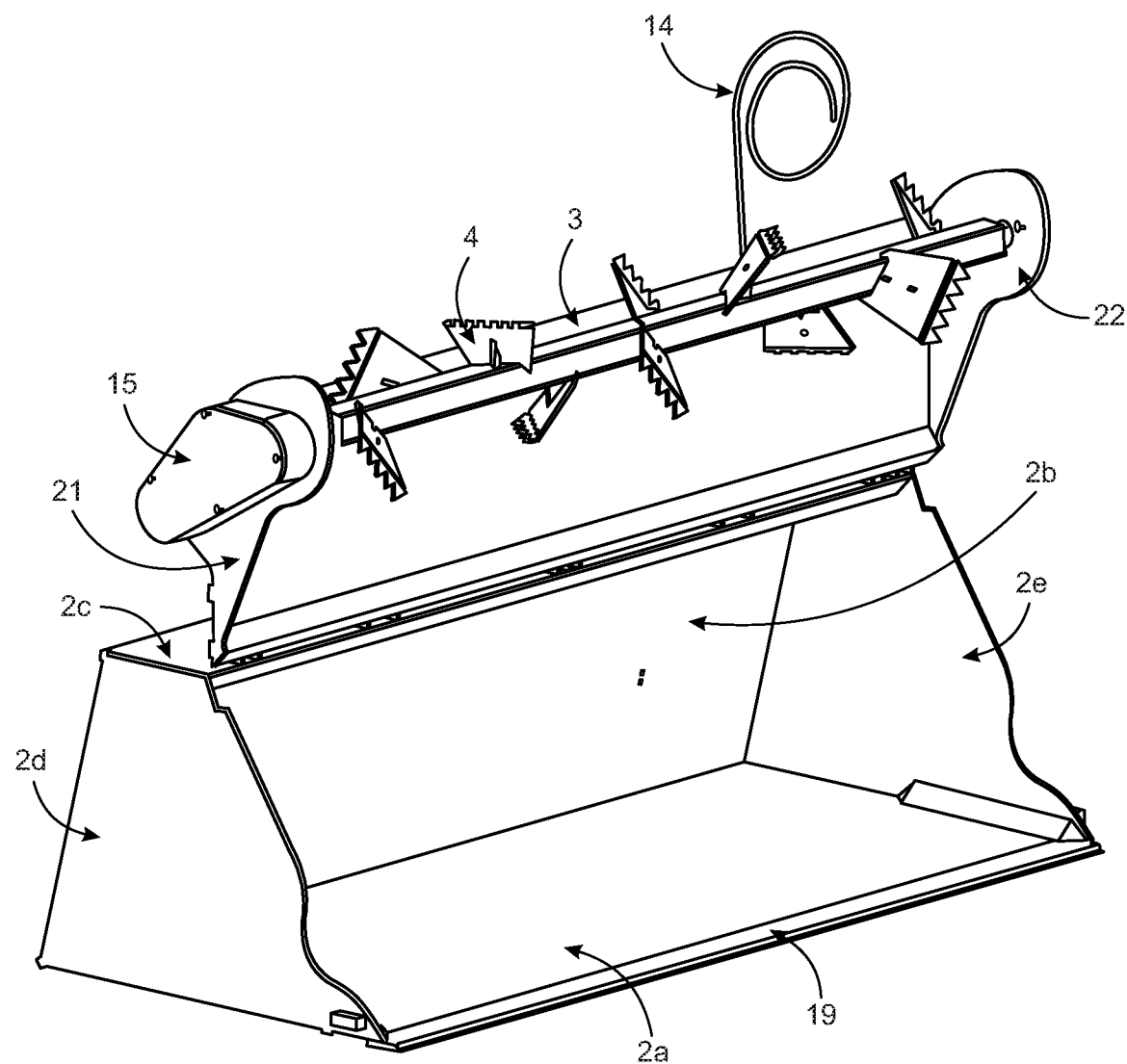
FIG. 3 shows a perspective view illustrating a skid steer manure spreader attachment with the cover open, according to an embodiment of the presently claimed invention.

As shown in FIGS. 2-3, the bucket 2 has a base 2a, a back 2b, a top 2c, and two sides 2d, 2e. An industry standard quick attach plate 20 is located on the back 2b so the manure spreader attachment 1 can be quickly attached to any standard skid steer 100. The bucket 2 is a standard width, preferably 60 to 100-inches in width with sizes varying in 6-inch width increments. The hose holder 14 is attached to the top 2c of the bucket 2 by a bolt or screw 23.

The beater shaft 4 is attached on each side to the side panels 21, 22 of the cover, so when the cover 3 is lifted, the beater shaft 4 is lifted too, the bucket 2 open for shoveling manure. The hoses 8, 9, 10 are not depicted in FIGS. 2-3.

Figure 4:
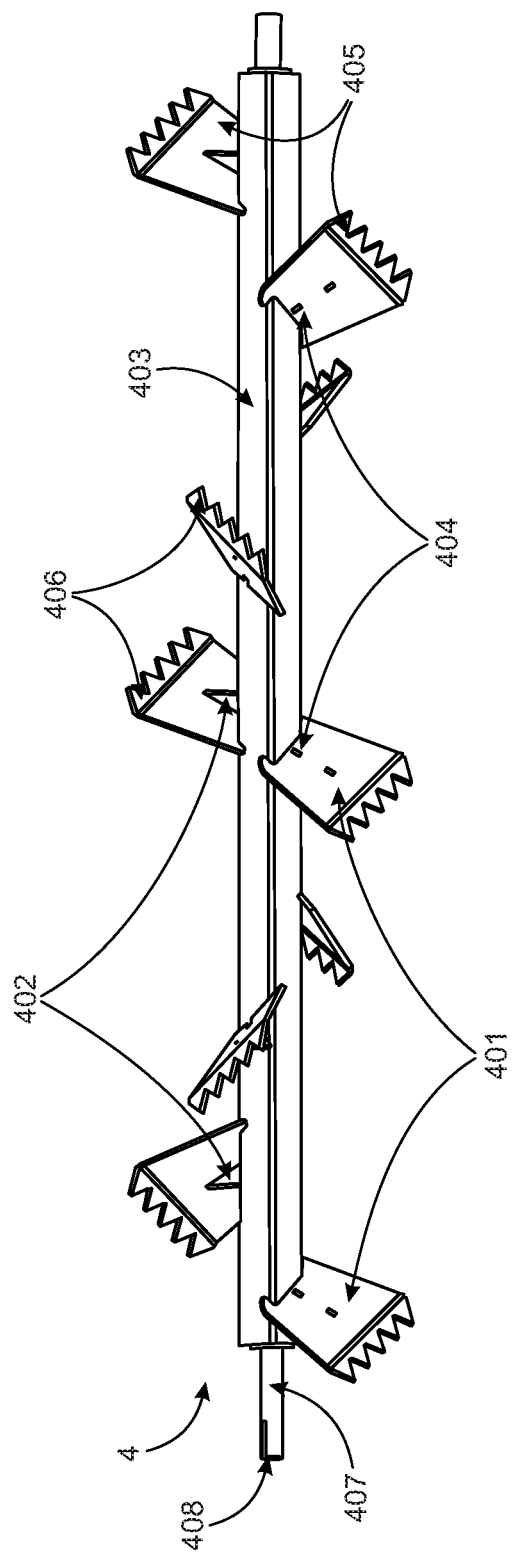
FIG. 4 shows a perspective view illustrating a beater shaft, according to an embodiment of the presently claimed invention.
Figure 5:
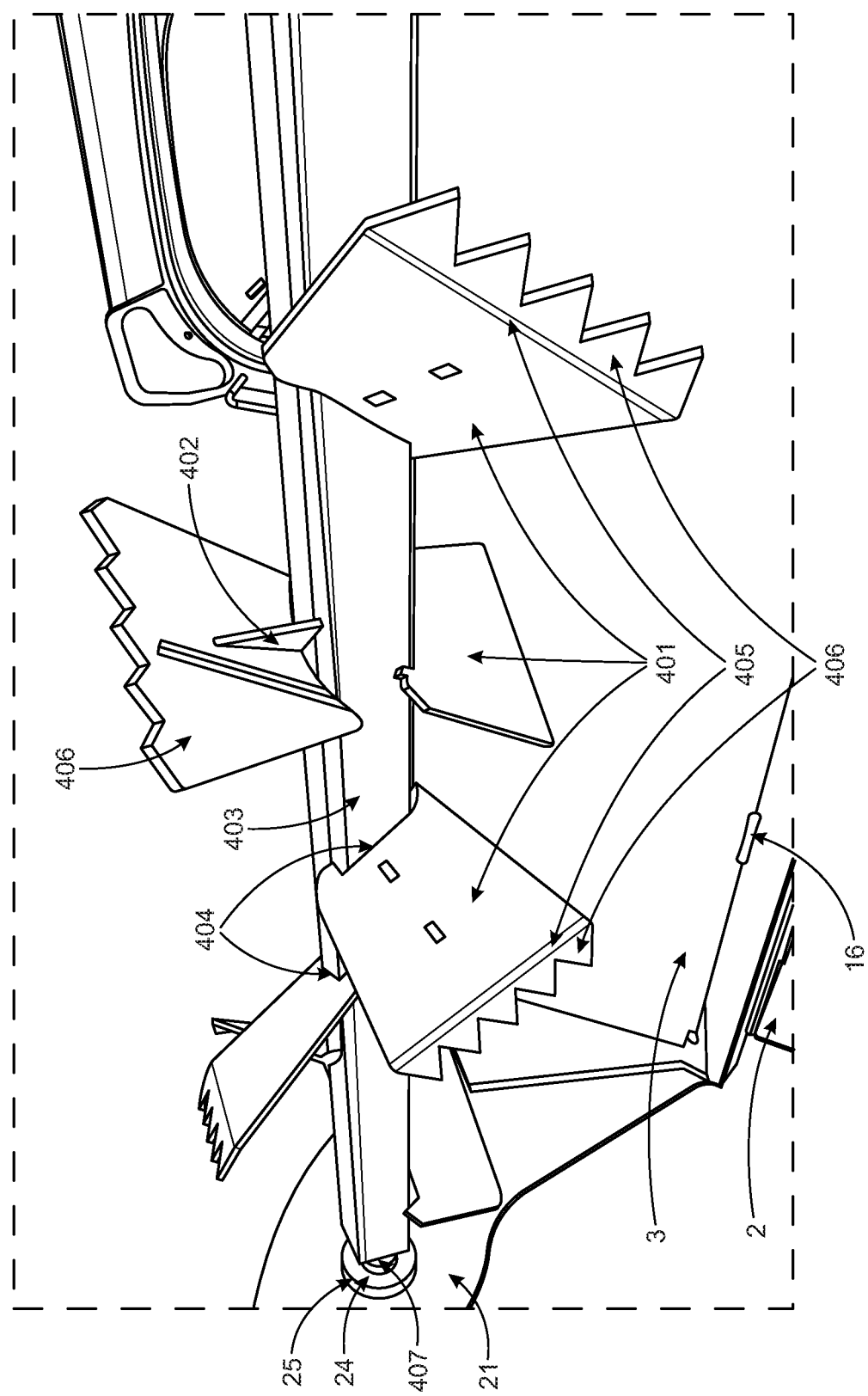
FIG. 5 shows a closer perspective view illustrating a beater shaft installed in a skid steer manure spreader attachment, according to an embodiment of the presently claimed invention.

As shown in FIGS. 4-5, the beater shaft 4 has a number of blades 401 angled in two directions, at angles that will maximize the distance the beater shaft will throw the manure. Each blade 401 has a support piece 402 on one face of the blade 401, and is welded to the shaft 403 of the beater shaft 4 along the bottom edge 404 of the blade 401. The top edge 405 of each blade 401 has a serrated edge 406 that is at an angle to the faces of the blade 401. The blades 401 may be set opposite each other, or individually, or opposite each other in the center, and individually along the rest of the shaft 403. The beater shaft 4 spins forward so the blades 401 throw manure out of the top of the bucket 2, above the beater shaft 4. The shaft 403 of the beater shaft 4 is preferably a piece of square metal tubing, preferably ¼ inch steel tubing, with the blades 401 welded thereon.

The shaft 403 has a solid round axel 407 running through the hollow center of the square tubing. The solid round axel 407 is welded in place inside the shaft 403 at each end. The solid round axel 407 extends through the bearings 24 in the holes 25 on either side 2d, 2e of the bucket 2, allowing the beater shaft 4 to rotate on the bearings 24. The solid round axel 407 and is preferably 1.25 inches in diameter. One side of the solid round axel 407 has a notch 408 to attach to a sprocket or other means of rotating the axel 407.

Figure 6:
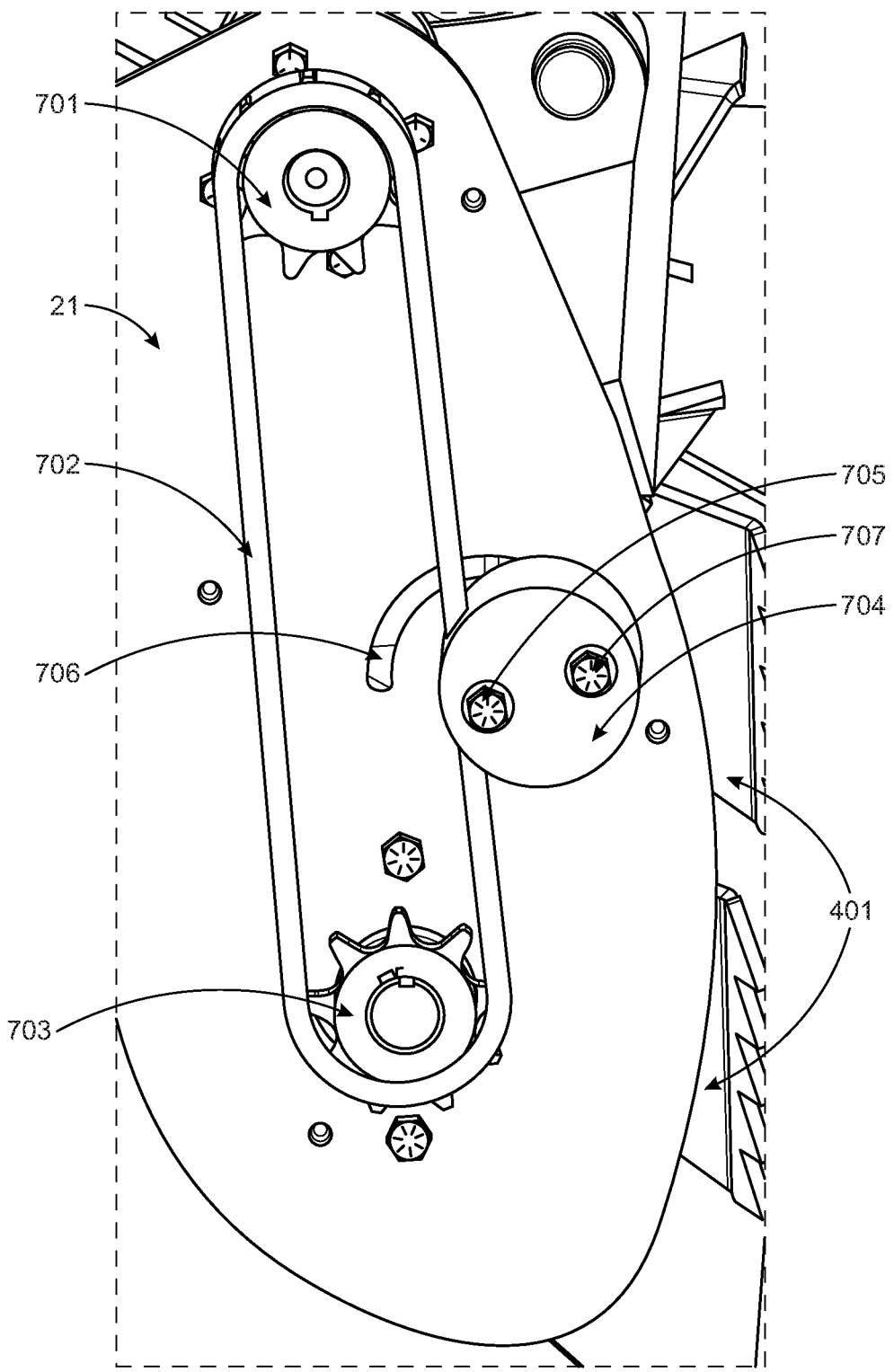
FIG. 6 shows a perspective view illustrating a chain and sprocket configuration for rotating a beater shaft, according to an embodiment of the presently claimed invention.

As shown in FIG. 6, the hydraulic motor 7 rotates the beater shaft 4 via a chain and sprocket system. Generally, the chain and sprocket system is protected by the removable housing 15 (not shown in FIG. 6). The hydraulic motor 7 drives the top sprocket 701. A chain 702 loops around the top sprocket 701 and the bottom sprocket 703, so that the rotation of the top sprocket 701 drives the rotation of the bottom sprocket 703. The bottom sprocket 703 attaches to the solid round axel 407 of the beater shaft 4 via the notch 408. The sprockets 701, 703 preferably have a 1:1 ratio, although other ratios are possible, so long as sufficient torque is achieved to rotate the beater shaft 4.

As the chain 702 will loosen over time, a tensioner 704 is also provided. The tensioner 704 pivots on one screw 705 along an arc 706 carved through the side 21 of the bucket 2, to allow the user to tension the chain 702 as needed. A second positioning screw 707 keeps the tensioner 704 connected to the arc 706. The tensioner 704 may be a cylindrical piece of ultra high molecular weight polyethylene (UHMW), or another high strength, highly abrasion-resistant plastic.

As shown in FIGS. 1-3, FIGS. 7-8, and FIGS. 10-11, the cover 3 is opened and closed by two hydraulic cylinders 5, 6, preferably welded body cylinders. Hydraulic cylinders are powered by pressurized hydraulic fluid, usually oil. Each of the hydraulic cylinders 5, 6 includes a cylinder barrel 5a, 6a, where a piston connected to a piston rod 5b, 6b moves back and forth therein. The barrel 5a, 6a is closed on one end by the cylinder bottom and the other end by the cylinder head, where the piston rod 5b, 6b comes out of the cylinder 5a, 6a. The piston has sliding rings and seals to keep the oil inside, and divides the inside of the cylinder 5a, 6a into two chambers, the bottom chamber, and the piston rod side chamber.

Each hydraulic cylinder 5, 6 is connected at both the cylinder bottom end and the piston rod end to a pair of flanges 25a, 25b, 26a, 26b, 27a, 27b, 28a, 28b by a suitable manner, such as a clevis fastener 29a, 29b, 30a, 30b. Each flange 25a, 25b, 26a, 26b, 27a, 27b, 28a, 28b is permanently attached to the either the bucket 2 or the cover 3, so that the piston rods 5b, 6b of the hydraulic cylinders 5, 6 are extended, the cover 3 is closed. The first hose 8 is connected to the bottom end of the cylinders 5, 6, while the second hose 9 is connected to the top end of the cylinders 5, 6, creating a forward direction and a backward direction of oil flow.

Figure 7:
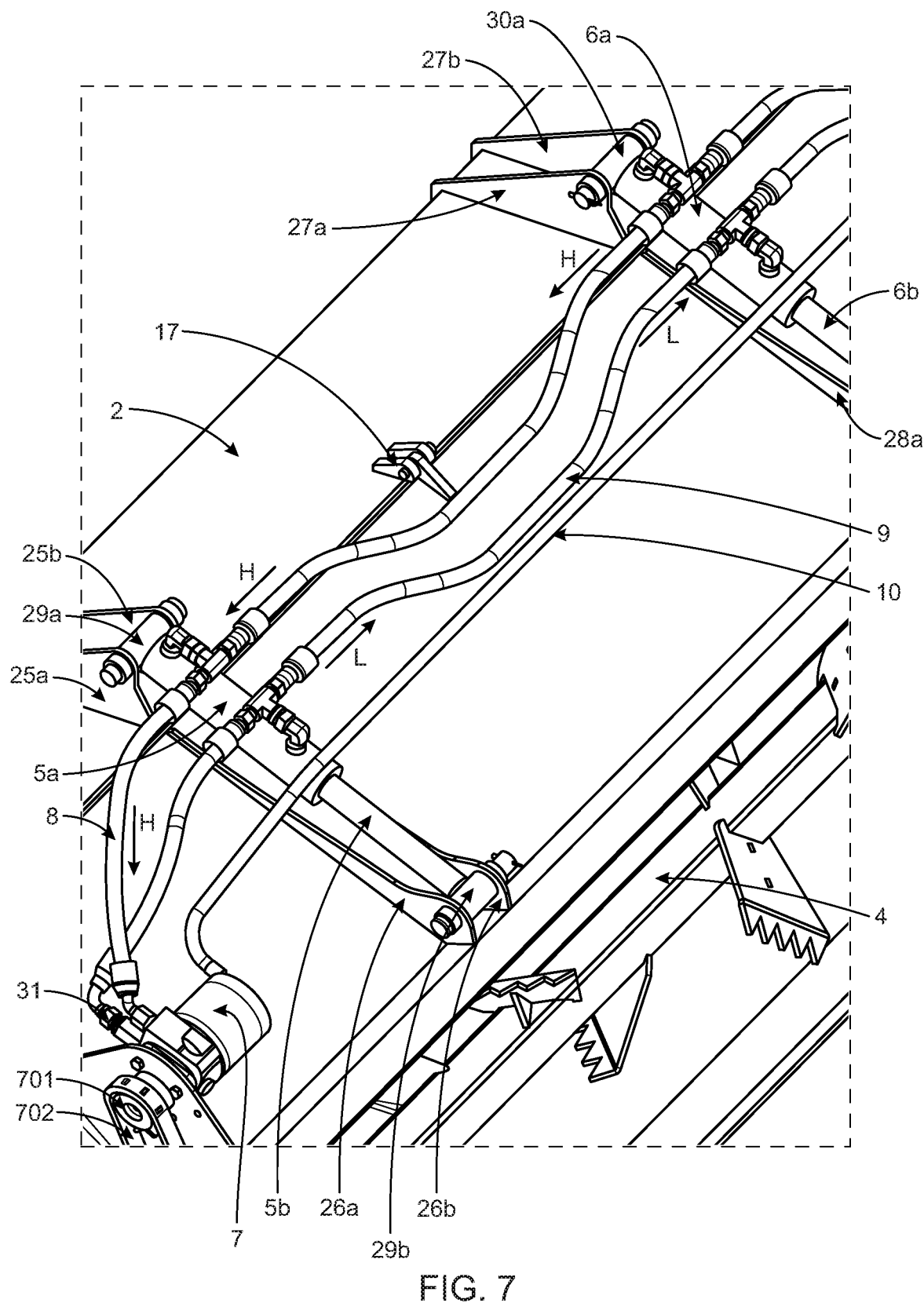
FIG. 7 shows a perspective view illustrating the oil flow through the hydraulics arrangement in a forward direction, according to an embodiment of the presently claimed invention.

As shown in FIG. 7, the hydraulic system has a forward function, and a reverse function. When the user turns the beater shaft on forward, high-pressure oil, will flow through the first hose 8 to one cylinder 6, then the next cylinder 5, then into the hydraulic motor 7 that spins the beater shaft 4. The flow is noted by the arrows on the hoses 8, 9, with high-pressure oil flowing where the arrows are marked with H, and low-pressure oil flowing where the arrows are marked with L. The oil runs through the hydraulic motor 7 in the direction required to spin the beater shaft 4 forward, in this setup, clockwise. After the oil flows through the motor 7, it loses pressure and flows through a check valve 31 back through the second hose 9 to return to the hydraulic pump.

When the system is pressurized in connection as shown in FIG. 7, namely, when the system is run in a forward direction, the piston rods 5b, 6b of the hydraulic cylinders 5, 6 are extended and the motor 7 is rotated forward/clockwise, in the direction of the oil flow, at the same time. Thus, when the cover 3 is fully open and the user wants to close the cover 3, they would hit the forward button and this will cause the beater shaft 4 to spin forward and the cylinders 5, 6 to extend, thereby closing the lid, at the same time.

Figure 8:
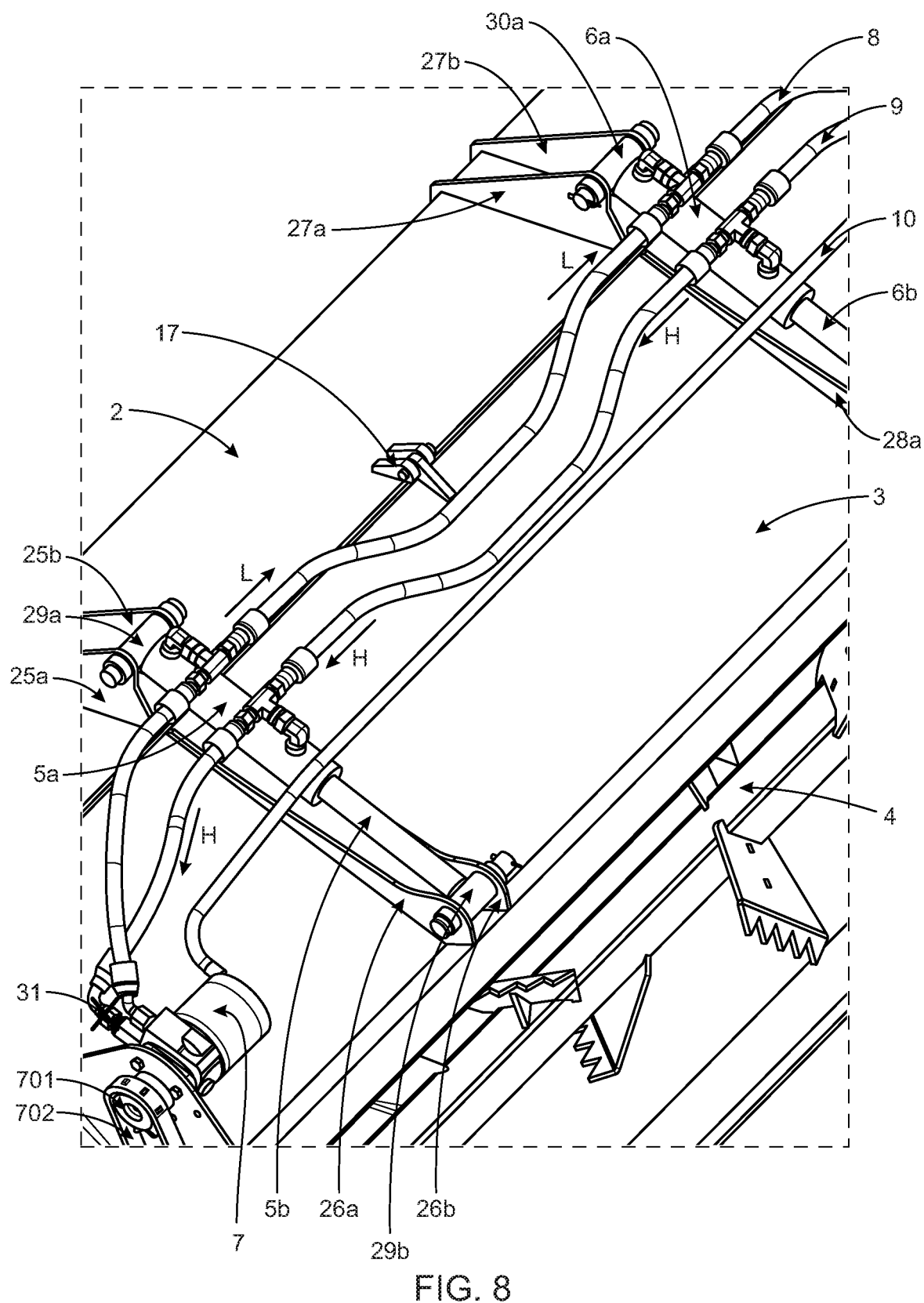
FIG. 8 shows a perspective view illustrating the oil flow through the hydraulics arrangement in a reverse direction, according to an embodiment of the presently claimed invention.

As shown in FIG. 8, when the operator hits the reverse button, high-pressure oil flows through the second hose 9, thereby retracting the cylinders 5, 6. The flow is noted by the arrows on the hoses 8, 9, with high-pressure oil flowing where the arrows are marked with H, and low-pressure oil flowing where the arrows are marked with L. The check valve 31 between the motor 7 and the second hose 9 prevents the oil from flowing backwards through the motor 7, as indicated by the X. Thus, when the user hits the reverse button, the cover 3 opens, but the beater shaft 4 does not spin backward.

Other configurations that separate these two functions are feasible, but may create additional manufacturing and maintenance costs, as well as complicate the use of the manure spreader. Therefore, the forward and reverse functions of the manure spreader attachment 1 created by connecting the cylinders 5, 6 and the motor 7 in parallel to the same hydraulic hoses 8, 9 and using a check valve 31 to prevent the motor 7 from spinning backwards are important to keep the attachment 1 simple and intuitive to use, allowing a user to do three things, namely open the cover 3, close the cover 3, and rotate the beater shaft 4, with only two operator functions.

Figure 9:
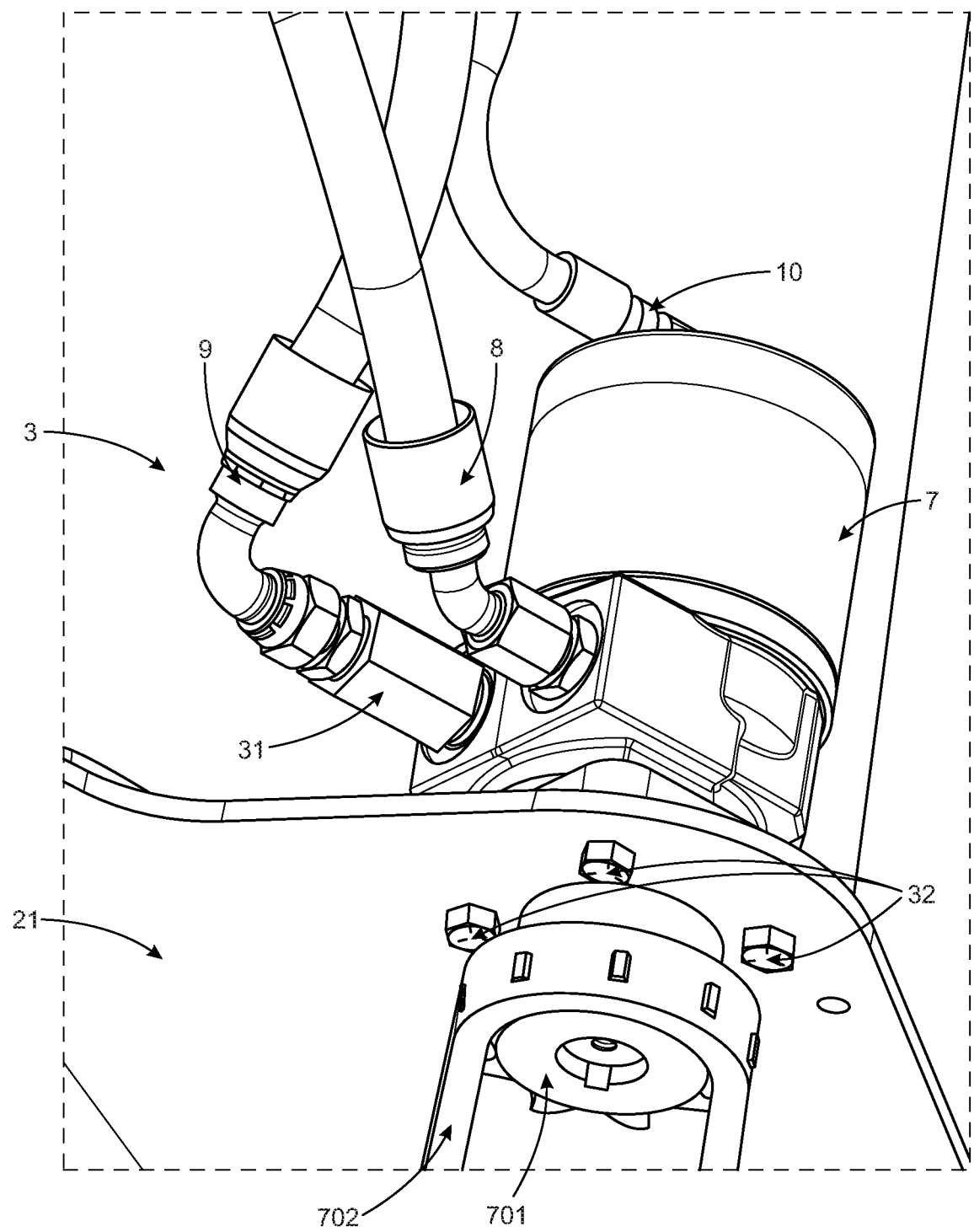
FIG. 9 shows a closer perspective view illustrating the hydraulic motor hydraulics arrangement, according to an embodiment of the presently claimed invention.
Figure 10:
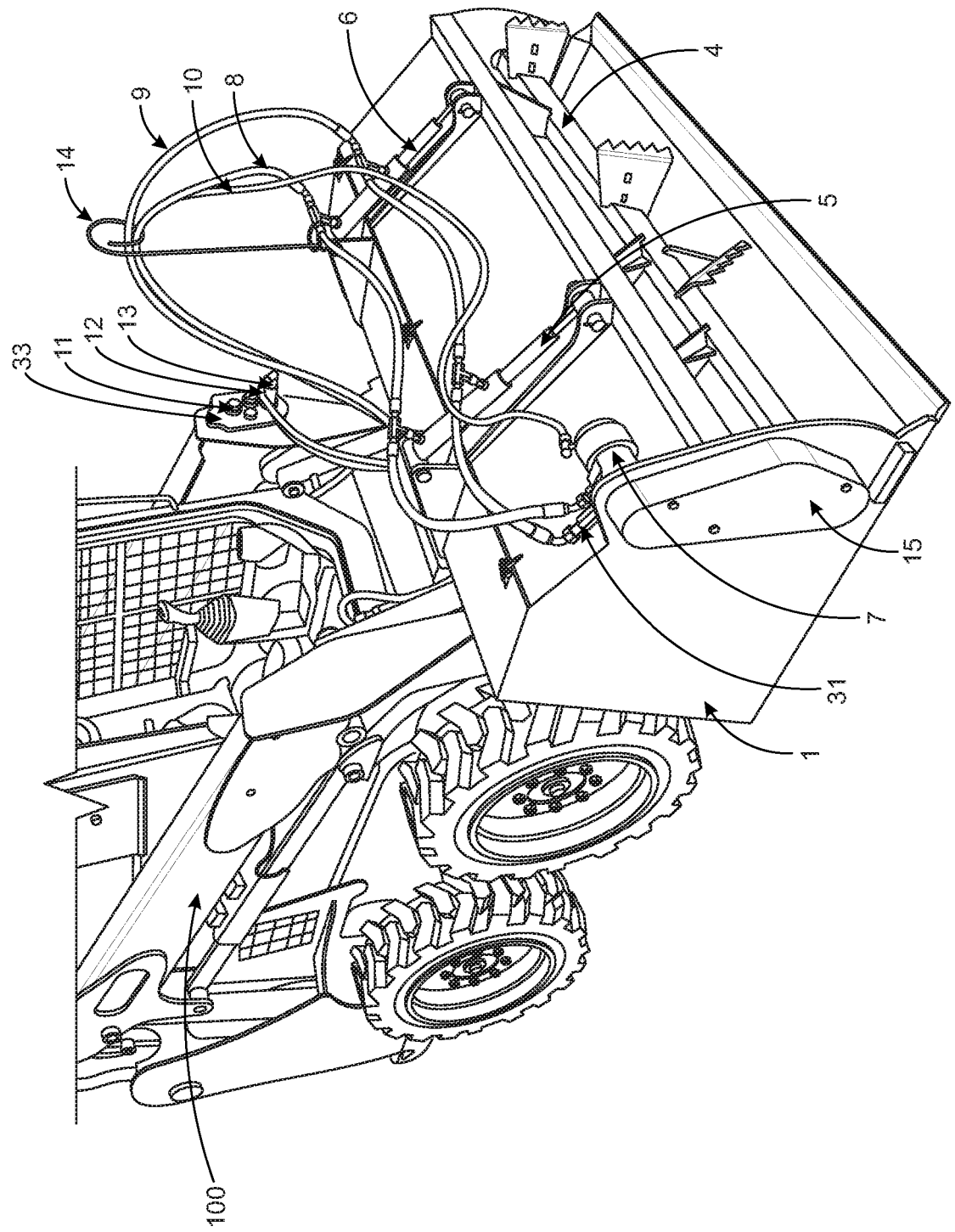
FIG. 10 shows a perspective view illustrating a skid steer manure spreader attachment attached to a skid steer with the cover closed and the attachment lowered, according to an embodiment of the presently claimed invention.

As shown in FIG. 9, the hydraulic motor 7 is removably attached to the side 21 of the bucket 2 via one or more bolts 32. The hydraulic motor 7 is connected to the three hoses 8, 9, 10. When oil flows forward, the motor spins clockwise (in this view, shown in FIG. 9) and the check valve 31 allows the flow of oil. When oil tries to flow in the reverse direction the check valve 31 restricts the flow of oil and doesn't allow it to pass through to the motor 7. The third hose 10 is the case drain, a common part of a hydraulic motor 7. As oil flows through the motor 7 a small amount leaks out of the seals (by design) and needs to be drained. The third hose 10, the case drain hose, brings this leaked oil it back to the skid steer 100, where, as shown in FIG. 10, there is a port 33 to connect the hoses 8, 9, 10 to the hydraulic pump. When in use, the housing 15 should cover the chain 702 and sprockets 701, 703 to protect them from debris interfering.

Figure 11:
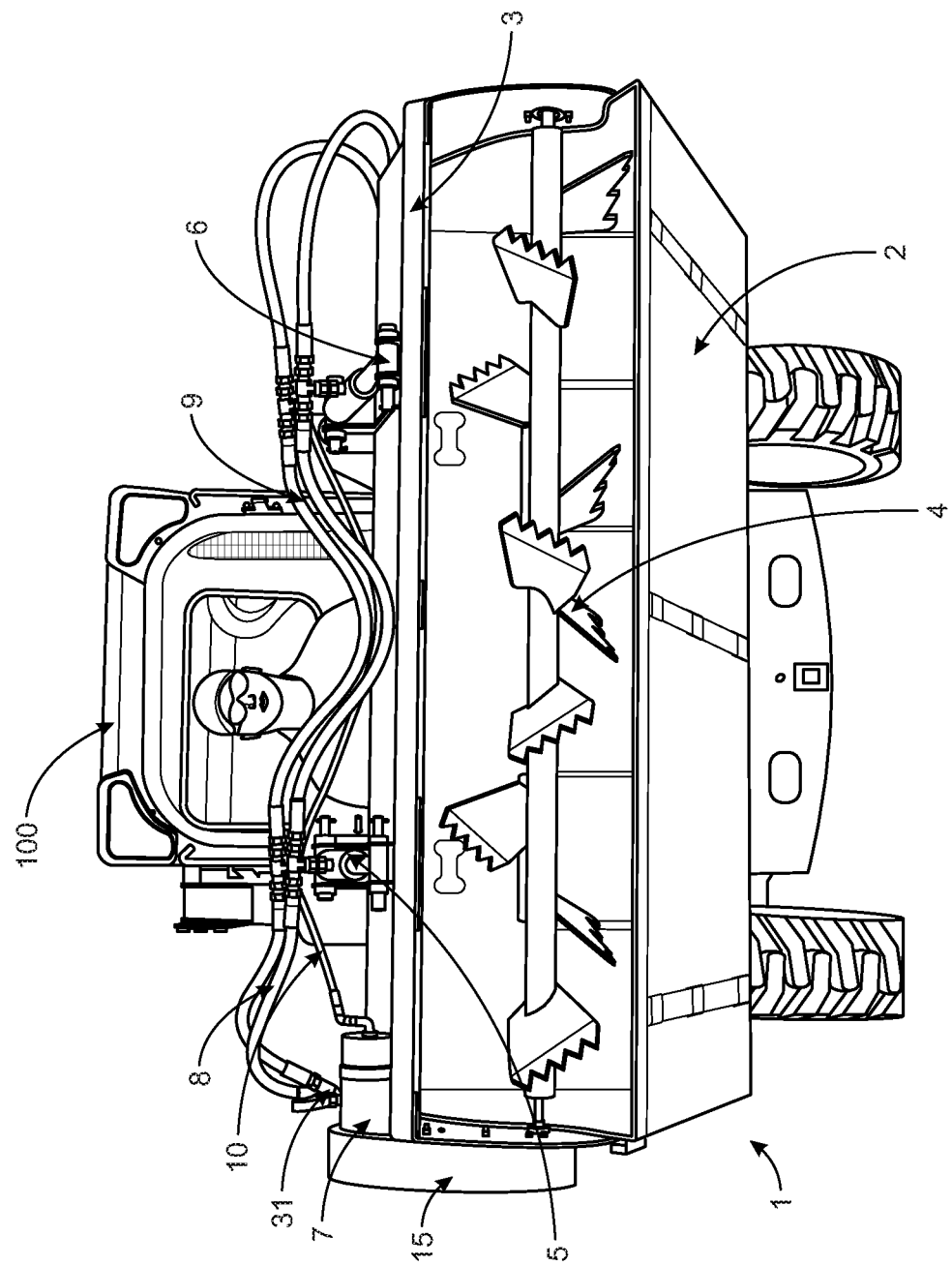
FIG. 11 shows a perspective view illustrating a user operating a skid steer manure spreader attachment attached to a skid steer, according to an embodiment of the presently claimed invention.

As shown in FIGS. 10-11, when attached to the skid steer 100, the hydraulic system of the manure spreader attachment 1 is hooked up so that the attachment 1 is operated by two buttons in the skid steer, in easy reach of the user. All three hoses 8, 9, 10 attach to a hydraulic pump on the skid steer 100 via industry standard couplers 11, 12, 13. This makes it so that a user can quickly and easily install the manure spreader attachment 1 by attaching the bucket 2 to the skid steer with the industry standard quick release plate 20, and connecting the three hoses 8, 9, 10 to a hydraulic pump.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A skid steer manure spreader attachment comprising:
    (a) a main bucket compartment having
        (i) a base part;
        (ii) a back part;
        (iii) a top part;
        (iv) first side part and a second side part; and
        (v) a standard skid steer quick attach plate, wherein the skid steer quick attach plate is operably located in the center of the back part;
    (b) a moveable cover having
        (i) a top part;
        (ii) a first side part with a first hole therein, wherein the hole contains a first set of bearings;

(iii) a second side part with a second hole therein directly opposite the first hole in the first side part, wherein the hole contains a second set of bearings;

(c) a beater shaft having
(i) a hollow shaft with a plethora of blades attached thereon at different angles;
(ii) a round axel,
wherein the round axel runs through the center of the hollow shaft and is operably connected to the hollow shaft at each end so that the hollow shaft rotates with the round axel,
wherein the round axel extends through the first hole on the first side of the cover and the second hole on the second side of the cover so that the beater shaft is connected to the cover,
wherein the round axel rotates on the first bearing set and the second bearing set to spin the hollow shaft;

(d) a hydraulic system having
(i) two hydraulic cylinders, each having
(1) a cylinder body;
(2) a piston;
(3) a piston rod, wherein the piston rod is attached to the piston;
(4) a bottom end and a piston rod end;
(ii) a hydraulic motor;
(iii) a first hose, wherein the first hose is operably connected to allow oil to flow into the bottom end of the cylinder body of each hydraulic cylinder and through the hydraulic motor in a direction that rotates the beater shaft forward;
(iv) a second hose, wherein the second hose is operably connected to allow oil to flow into the piston rod end of the cylinder body of each hydraulic cylinder and away from the hydraulic motor;
(v) a check valve, wherein the check valve is operably connected between the hydraulic motor and the second hose to allow oil to flow from the hydraulic motor to the second hose and prevent oil from flowing from the second hose into the hydraulic motor;
(vi) a case drain hose, wherein the case drain hose is operably connected to the hydraulic motor to drain away a small amount of leaked oil;
(vii) four pairs of flanges; and
(viii) four cylinder-flange connectors,
wherein two pairs of flanges are operably connected to the cover, and two pairs of flanges are operably connected to the main bucket compartment,
wherein each hydraulic cylinder is connected to one of the pairs of flanges operably connected to the main bucket compartment, and one of the pairs of flanges operably connected to the cover so that when the two pistons extend, the cover moves to a closed position, and when the two pistons contract, the cover moves to an open position;

(e) a chain and sprocket system having
(i) a first sprocket, wherein the first sprocket is operably connected to be rotated by the hydraulic motor;
(ii) a second sprocket, wherein the second sprocket is operably connected to rotate the round axel of the beater shaft;
(iii) a chain, wherein the chain is operably connected to the first sprocket and the second sprocket so that the chain transfers the rotation of the first sprocket to the second sprocket;

(iv) a tensioner, wherein the tensioner is pivotable at a tensioner screw, and wherein the tensioner is operably positioned to create varying tension on the chain when pivoted;
(v) a removeable housing cover, wherein the removeable housing cover protects the chain and sprocket system from debris;

(f) a hose holder operably connected to the top part of the main bucket compartment to hold the first hose, the second hose, and the case drain house out of the way of the moveable cover.

2. The skid steer manure spreader attachment according to claim 1, wherein the main bucket compartment and the cover are formed from ¼ inch steel, welded to shape.

3. The skid steer manure spreader attachment according to claim 1, wherein each of the four cylinder-flange connectors is a clevis fastener.

4. The skid steer manure spreader attachment according to claim 1, wherein the main bucket compartment further comprises:
(vi) a lip along an entire outer edge of the base part.

5. The skid steer manure spreader attachment according to claim 1, wherein the plethora of blades on the hollow shaft of the beater shaft each has a support flange and a serrated top edge.

6. The skid steer manure spreader attachment according to claim 2, wherein the ¼ inch steel is powder coated after welding to protect the steel from rust.

7. The skid steer manure spreader attachment according to claim 1, wherein the main bucket compartment has a width of approximately 60 to 100 inches.

8. The skid steer manure spreader attachment according to claim 1, wherein the hollow shaft of the beater shaft is a length of square ¼ inch steel tubing,
wherein the blades are welded thereon,
wherein the round axel is a solid steel cylinder with a diameter of 1.25 inches, and
wherein the round axel is welded to the hollow shaft at each end.

9. The skid steer manure spreader attachment according to claim 1, wherein the round axel has a notch in one end,
wherein the second sprocket has a tab on one side, and
wherein the tab on the second sprocket is operably connected to the notch on the round axel so that the second sprocket rotates the round axel.

10. The skid steer manure spreader attachment according to claim 1, wherein the first sprocket and the second sprocket have a ratio of 1:1.

11. The skid steer manure spreader attachment according to claim 1, wherein the tensioner is a cylindrical piece of ultra high molecular weight polyethylene.

12. The skid steer manure spreader attachment according to claim 1, wherein the tensioner pivots along an arc cut through the first side part of the main bucket compartment, and wherein the tensioner is held in a desired position along the arc via a positioning screw.

13. The skid steer manure spreader attachment according to claim 1, wherein the hydraulic motor is removably attached to the first side part of the main bucket compartment via one or more bolts.

14. The skid steer manure spreader attachment according to claim 1, wherein the plethora of blades are attached along the hollow shaft in pairs opposite each other, or individually, or in a pair opposite each other in a center of the hollow shaft and individually along the rest of the shaft.

15. The skid steer manure spreader attachment according to claim 1, wherein the plethora of blades are angled to throw manure out of the main bucket compartment when the cover is in a closed position.

16. The skid steer manure spreader attachment according to claim 1, wherein the hose holder is removably attached to the top part of the main bucket compartment via a bolt or a screw.

17. A method of operating the skid steer manure spreader attachment according to claim 1, the method comprising the steps of:
   (a) providing the skid steer manure spreader attachment according to claim 1;
   (b) connecting the skid steer manure spreader attachment to a skid steer via the standard skid steer quick attach plate;
   (c) connecting the first hose, the second hose, and the case drain hose to one or more ports on the skid steer so that the first hose and the second hose are connected to a hydraulic pump, and a small amount of leaked oil from the hydraulic motor is drained via the case drain hose;
   (d) moving the skid steer to a location with manure;
   (e) operating the hydraulic pump so the skid steer manure spreader attachment runs in a reverse direction, with high-pressure oil flowing from the hydraulic pump through the second hose into the piston rod end of each hydraulic cylinder, then is blocked from flowing through the hydraulic motor by the check valve, and returns low-pressure oil through the first hose and into the bottom end of each hydraulic cylinder, then back to the hydraulic pump, thereby contracting the hydraulic cylinders to open the cover but not rotating the beater shaft;
   (f) scooping manure into the main bucket compartment;
   (g) moving the skid steer to a desired location for the manure;
   (h) operating the hydraulic pump so the skid steer manure spreader attachment runs in a forward direction, with high-pressure oil flowing from the hydraulic pump, through the first hose into the bottom end of each hydraulic cylinder, then through the hydraulic motor, and low-pressure oil returning through the check valve, then through the second hose into the piston rod end of each of the hydraulic cylinders, and finally to the hydraulic pump, so that hydraulic cylinders extend, moving the cover to a closed position, and the hydraulic motor is activated, spinning the beater shaft and spreading the manure;
   (i) repeating steps (d)-(g) until a desired amount of manure has been relocated and spread.

* * * * *